(12) United States Patent
Herz et al.

(10) Patent No.: US 9,736,514 B2
(45) Date of Patent: *Aug. 15, 2017

(54) DIGITAL AUDIO-VIDEO CONTENT MOBILE LIBRARY

(71) Applicant: Warner Bros. Entertainment, Inc., Burbank, CA (US)

(72) Inventors: Justin Herz, Los Angeles, CA (US); Kevin Kozan, Seattle, WA (US); Essam Mahmoud, Glendale, CA (US); ALan Levicki, Glendale, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/923,313

(22) Filed: Oct. 26, 2015

(65) Prior Publication Data

US 2016/0044351 A1 Feb. 11, 2016

Related U.S. Application Data

(63) Continuation of application No. 13/281,222, filed on Oct. 25, 2011, now Pat. No. 9,172,984.

(Continued)

(51) Int. Cl.
*H04N 21/61* (2011.01)
*H04N 21/254* (2011.01)
*H04N 21/258* (2011.01)
*H04N 21/414* (2011.01)
*H04N 21/4627* (2011.01)

(Continued)

(52) U.S. Cl.
CPC ... *H04N 21/2541* (2013.01); *H04N 21/25808* (2013.01); *H04N 21/25875* (2013.01); *H04N 21/41407* (2013.01); *H04N 21/4627* (2013.01); *H04N 21/4882* (2013.01); *H04N 21/6131* (2013.01); *H04N 21/8166* (2013.01);

(Continued)

(58) Field of Classification Search
None
See application file for complete search history.

(56) References Cited

U.S. PATENT DOCUMENTS 8,402,555 B2 3/2013 Grecia
8,533,860 B1 9/2013 Grecia (Continued)

*Primary Examiner* — Ranodhi Serrao
(74) *Attorney, Agent, or Firm* — Jonathan Jaech; Snell & Wilmer L.L.P.

(57) ABSTRACT

Methods for managing digital content include authenticating a user account identifier from a client device over a computer network, registering a telephone number for at least one wireless mobile device in a registry identified with the user account based on the authenticating, as a pre-authorized identifier for accessing digital content licensed for use with the client device. The methods include maintaining a library of digital content identified with the user account for access by the at least one wireless mobile device, and initiating streaming of the digital video content to the at least one wireless mobile device without requiring user authentication from the at least one wireless mobile device, based on the registering of the telephone number as the pre-authorized identifier. An apparatus for performing the method comprises a processor coupled to a memory, the memory holding instructions for performing steps of the method as summarized above.

16 Claims, 8 Drawing Sheets

Related U.S. Application Data

(60) Provisional application No. 61/406,512, filed on Oct. 25, 2010.

(51) Int. Cl.
    *H04N 21/488*     (2011.01)
    *H04N 21/8355*     (2011.01)
    *H04N 21/8358*     (2011.01)
    *H04N 21/84*     (2011.01)
    *H04N 21/81*     (2011.01)

(52) U.S. Cl.
    CPC ..... *H04N 21/8355* (2013.01); *H04N 21/8358* (2013.01); *H04N 21/84* (2013.01)

(56) References Cited

U.S. PATENT DOCUMENTS

| | | |
|---|---|---|
| 2005/0262151 A1 | 11/2005 | Plastina et al. |
| 2009/0271633 A1 | 10/2009 | Cohen |
| 2010/0017725 A1 | 1/2010 | McCarthy et al. |
| 2011/0265157 A1 | 10/2011 | Ryder |
| 2012/0079095 A1 | 3/2012 | Evans et al. |
| 2012/0079126 A1 | 3/2012 | Evans et al. |
| 2012/0079276 A1 | 3/2012 | Evans et al. |
| 2012/0079606 A1 | 3/2012 | Evans et al. |

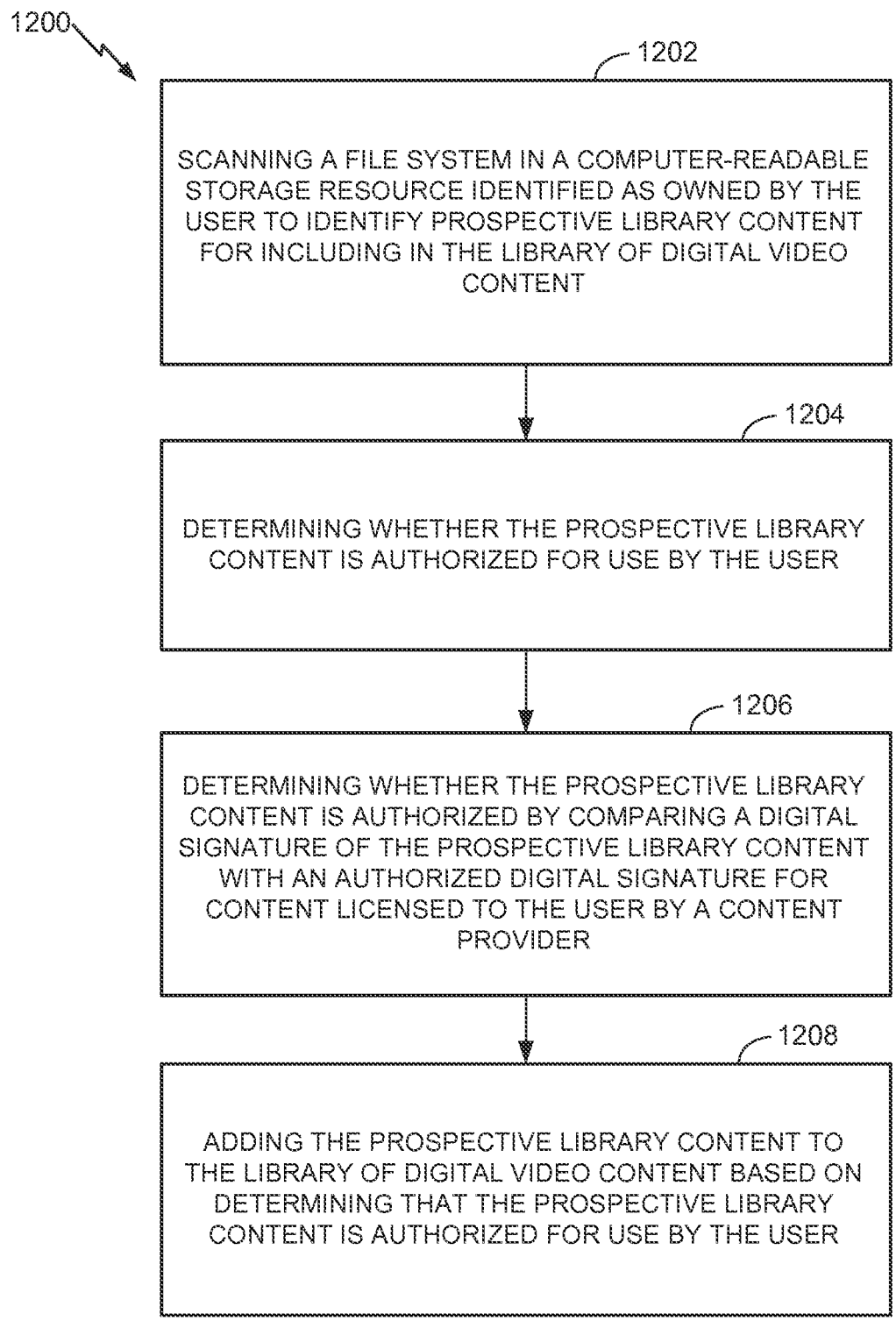

DIGITAL AUDIO-VIDEO CONTENT MOBILE LIBRARY

CROSS-REFERENCE TO RELATED APPLICATION

This application is a continuation of U.S. non-provisional application Ser. No. 13/281,222, filed Oct. 25, 2011 now U.S. Pat. No. 9,172,984, which claims priority pursuant to 35 U.S.C. §119(e) to U.S. provisional application Ser. No. 61/406,512, filed Oct. 25, 2010, which is hereby incorporated by reference, in its entirety.

BACKGROUND

1. Field

This application relates to methods and apparatus for implementing a digital audio-video content mobile library.

2. Description of Related Art

Digital audio-video content is increasingly delivered to consumers via a delivery channel known as digital download. Digital download refers to transmission of digital audio-video content, sometimes called digital content, from a source device to a designated client device via a communications or computer network, in response to a client request requesting the specific digital content that is delivered. Digital download may be typically provided over broadband wide-area networks, for example, the Internet. Digital content may be stored as one or more files in a memory for the destination device. Access to the digital content may be limited to one or more destination devices or to one or more specific user accounts. Access to digital content may be restricted to a specific time window, or may be unrestricted using digital rights management (DRM). The client receiving a digital download is typically equipped with a processor, user interface, and memory. For example, a client may comprise a computer, smart phone, or notepad device. Digital content may include, for example, motion pictures, documentaries, episodes of serial programming, or special features.

In addition, digital content may be streamed to a destination device for streaming video. Streaming is a type of digital download in which a particular file is downloaded to a client device in response to a client request for viewing via a video interface object, but no copy of the downloaded file is saved on the client device after the video interface object unloads the file or is terminated. Therefore, to view a streamed copy at the same client after the video interface unloads the file or is terminated, it must be streamed again from the source to the object.

Digital download may be contrasted with distribution via a broadcast channel, as used in television broadcasting via cable, wireless, or satellite networks. Broadcast channels, even digital channels, provide a predetermined stream of audio-video data to a set-top box, video recorder, television, or other client, typically over a dedicated transmission channel. The stream may be recorded if the client is equipped with memory, but is not provided in response to a specific request for specific digital content. The client device may select different channels for viewing, but not specific content files within a channel.

Broadcast channels as used to deliver content over dedicated transmission channels should not be confused with the term "channel" as sometimes used in digital downloading over computer networks. In the context of a digital download, a "channel" may refer to bundling multiple files together as a subscription service, and optionally releasing different files for download at different times. Thus, a user may subscribe to a channel that provides access to a specific type of content for digital download, for example, a comedy, sports, or travel digital download channel. However, unlike broadcast channels, a digital download channel permits users to select specific content within the channel's offerings for digital download to a specified client device, at a time of the user's choosing.

Digital download systems thereby permit users to download copies of digital audio-video content to a designated client device. In some circumstances, for example with copyrighted content provided under a license in exchange for payment or the like, the digital download is conditioned on the client device being associated with an identifier for a user account. Notwithstanding the advantages of current digital download systems, it would be desirable to improve upon the capabilities of current systems to permit more flexible use of downloaded content on different client devices.

As used herein, "digital audio-video content" or "digital content" refers to audio-video content encoded as a digital file or files. Audio-video content is characterized by a sequence of video frames coupled to an audio track, for playing in sequence by a media player application on the client device. In addition, as used herein, a "file" or "digital file" refers to a set of electronic digital data that is encoded in a computer-readable storage medium (e.g., a non-transitory medium) and referenced by a file name or similar identifier in a directory or similar data structure for the storage medium. As such, a file is clearly distinguished from a packet or other transient data set transmitted via a carrier wave. Information contained in a file and file metadata may be transmitted using a carrier wave, for replicating the file in a different storage medium. Such transmission and replication may sometimes be referred to as "transmitting a file," but this and similar terminology does not negate the essential character of a file being a discrete data set encoded in a storage medium.

SUMMARY

It would be desirable, therefore, to provide a technology enabling consumers to redeem digital copies of audio-video content by downloading a file to their personal computer (PC) associated with a corresponding user account, while enabling the user to view a downloaded file on one or more designated mobile devices. Thus, for example, a consumer may download a copy of a motion picture or other digital audio-video content under a license from its copyright holder, for viewing on the PC. Under the same license governing use of the downloaded file, the consumer designates one or more mobile devices to be used for accessing the downloaded content, each of which is assigned a telephone number for a communications network. A viewing application is installed on each of these mobile devices. The mobile device can then be used by any person to access the content downloaded to the PC, via streaming from a network server connected to the mobile device's communications network. The technology may be configured such that no user authentication is required to view the content on the mobile device. Instead, the mobile device's phone number operates as a pre-authorized identifier for accessing content licensed in association with the PC.

The technology may be implemented as a method performed using one or more computers configured for serving information over a network, such as a wide area network. For example, a Digital Content Management (DCM) server may, in response to validating a user account identifier received from a client computer (for example, a PC or other computer), register mobile device platform information and telephone number information for at least one wireless mobile device indicated by information received from the client in a registry identified with the user account. To validate the user account identifier, the DCM server may use a digital content manager application installed on the client computer. In addition, the DCM server may reserve the digital content manager and the digital video content library for use with the user account identifier only, in response to validating the user account identifier via the digital content manager application.

The DCM server may also maintain a library of digital video content identified with the user account, available for serving the digital video content to the client computer. The DCM server may serve digital video content identified in the library to the client computer, either via digital download of files or by streaming video service. In some embodiments, the DCM server may maintain a copy of the digital video content library on the client computer, synchronized with the library maintained at the DCM server.

In addition, the DCM server may provide the digital content, the mobile device platform information and the telephone number information to a mobile content server, to enable on-demand streaming video delivery of the digital video content from the mobile content server to the at least one mobile device without requiring the user account identifier to be provided from the at least one mobile device.

The mobile content server may convert the digital video content to a mobile form compatible with the mobile device platform, provide software to the mobile device for obtaining and accessing mobile content, receive requests for content from mobile devices, and stream video content to mobile devices identified as authorized to receive content by the DCM server.

The DCM server may also track and make a record of progress of the on-demand streaming video delivery of the digital video content from the mobile content server to the at least one mobile device, to enable play of the digital video content to resume at the client computer at a point where the streaming video delivery is terminated to the at least one mobile device. Likewise, the mobile content server may track and make a record of the progress to enable play of the digital video content to resume at any client in the registry at a point where the streaming video delivery is terminated to the at least one mobile device.

The system may also handle temporary copies of digital content; i.e., copies that are downloaded to a client device but for which viewing rights are limited to a defined period of time. For example, viewing rights may be limited to period expiring 24 hours after play of the content is first initiated. The DCM server may initiate a viewing period for a title of the digital video content, in response to play of the title being initiated on any one of the client computer or mobile client in the registry, wherein play of the title is not permitted on any one of the client computer or mobile client in the registry, after expiration of the viewing period. In some embodiments, the temporary copy may be viewed using any registered client, including mobile devices. Therefore, the DCM server may also synchronize data defining the viewing period between it and the mobile content server.

In an aspect, access to library content from a mobile device is provided via an application downloaded to the mobile device after the device is registered as belonging to a user account. To facilitate installation of the mobile access application, the mobile content server or the DCM server may transmit an SMS message addressed to the telephone number, in response to registration of the mobile device platform information and telephone number information with the DCM server. In some embodiments, the transmitting server may include a link for downloading a viewing application for the mobile device in the SMS message that it transmits to the mobile device. The link may be configured such that, in response to user selection of the link via a mobile device interface, installation of the viewing application on the mobile device is automatically initiated by a server in cooperation with the mobile device.

The foregoing technology may be implemented as encoded instructions on a non-transitory computer-readable medium, which, when executed by one or more processors of a computer, cause the computer to perform the novel operation as described above to achieve results as described herein. The non-transitory computer-readable medium may be, or may include, a storage medium or memory medium. The technology may be implemented in an apparatus, for example a computer server, having a processor and memory, wherein the memory holds code for causing the server to perform the novel method to achieve results as described herein. The present disclosure therefore discloses illustrative steps of a method as exemplifying the novel technology, which is not limited to a method and may be implemented in various other ways such as described herein.

A more complete understanding of the method and system for a digital audio-video content mobile library will be realized by one of ordinary skill in the art, as well as a realization of additional advantages and objects thereof, by considering the following detailed description. Reference will be made to the appended sheets of drawings, which will first be described briefly.

BRIEF DESCRIPTION OF THE DRAWINGS

The present invention, in accordance with one or more various embodiments, is described in detail with reference to the following figures.

FIGS. 8-12 are flow charts each showing examples of various different additional operations that may be performed in association with the method shown in FIG. 6.

DETAILED DESCRIPTION OF VARIOUS EMBODIMENTS

Figure 1:
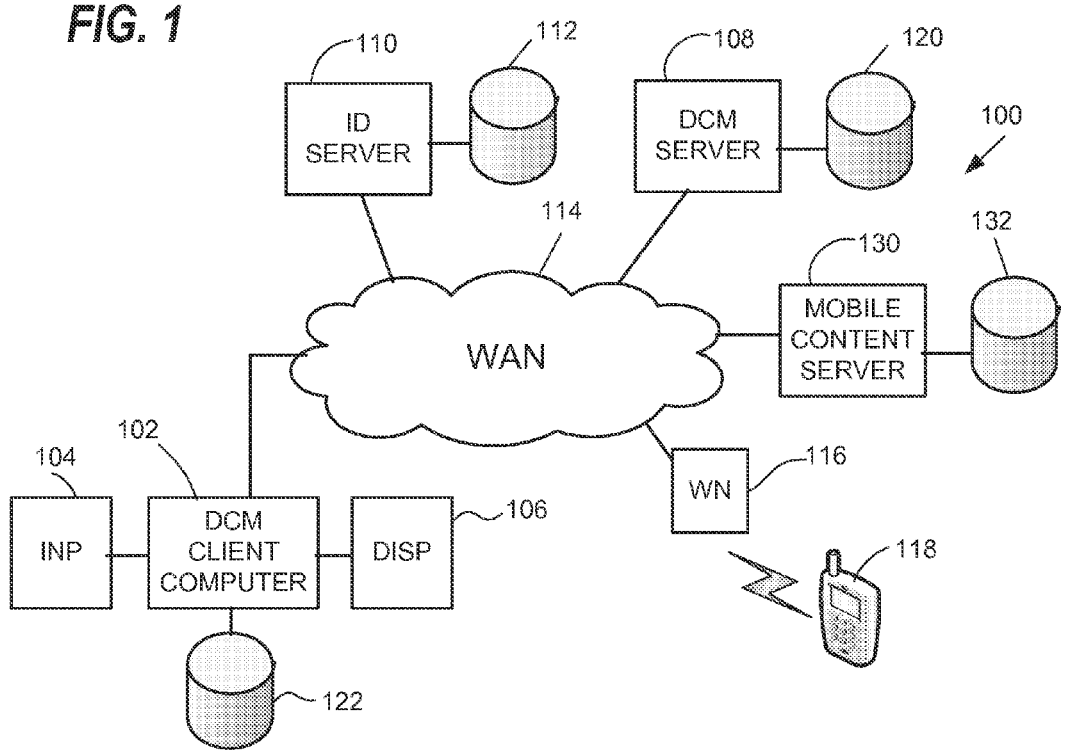
FIG. 1 is a block diagram showing an example of a system for managing and distributing contents of a digital content library to multiple clients, including mobile devices, registered for use with a user account.

An example of a system 100 including aspects of managing and distributing digital audio-video content to mobile devices is shown in FIG. 1. The system may comprise a DCM client computer 102, for example, a personal computer, laptop computer, notebook computer, tablet computer, smart phone, or the like, for accessing digital content using a display device 106 to view video output from the client 102, in response to input from an input device 104. The input device 104 may comprise a keyboard, touchscreen, microphone, or other transducer for converting physical input from a user into electrical signals for the client 102. Client 102 may comprise a processor, memory, network interface, and computer graphics display driver for providing video output to the display device 106, comprising an LCD display screen or similar device. Files containing protected audio-video content and metadata may be encoded on a computer-readable storage medium 122 coupled to the client 102, such as, for example, a magnetic, optical, or electronic data storage device. The client 102 may be configured to decode and decompress encoded content, and decrypt protected content, to provide a video signal for the display 106. The computer-readable medium 122 may further hold encoded instructions for performing certain actions as described herein, and downloaded digital video content files belonging to a digital content library for a user.

System 100 may further comprise one or more wireless networks 116 coupled to a wide area network (WAN) 114, for communicating with one or more wireless mobile clients 118. It is contemplated that a wireless mobile client 118 may include components that are generally the same as or similar to client 102, and perform the same or similar functions. In addition, each mobile client 118 may belong to a wireless communication system (WCS) wherein it is assigned a telephone number that uniquely identifies it within the WCS.

The client 102 may further comprise a network interface for communicating via the WAN 114, for example, the Internet. Via such an interface and network, the player device may communicate with a DCM server 108 operating a digital content management application responsive to input from multiple clients, such as clients 102 and 118. The DCM server 108 may be coupled to a computer-readable storage medium 120, such as, for example, a magnetic, optical, or electronic data storage device. The computer-readable medium 120 may hold encoded instructions for performing certain actions as described herein, and copies of digital content belonging to content libraries defined for one or more users. The DCM server may enable distribution of content to multiple clients for validated system users via digital download of content files, streaming video, or both.

The DCM server may validate the identity of users authorized to access content via the system 100, by communicating with an identification server 110. In the alternative, or in addition, the DCM server may incorporate functions for validating user identifications. The identification server 110 registers new users and validates identities of existing users. The identification server 110 may be coupled to a secure database 112, which may store user data, including, for example, account identifiers, passwords, contact information, and payment information. The identification server 110 or other network component may also manage subscriptions and payments. Generally, license fees of various types may be charged to users for access to content provided from the DCM server 108.

Index data, including identifiers and content titles, for data files stored in network locations and locally may be aggregated in a library index for all files accessible via a particular client and/or user account. As noted, such files may be obtained from multiple different sources. In some embodiments, the library index may be stored and maintained at the DCM server 108 or other central network server. In the alternative, or in addition, library files may be stored and maintained locally at individual client devices, for example, clients 102 and 118. However, in some embodiments, library content is not stored on mobile devices such as client 118. Instead, mobile clients access library content via streaming video, wherein a short-term cache of video data is stored on the mobile device during a video streaming access session, but the cache is deleted in response to completion of the access session.

In addition to the DCM server 108, the system 100 may include a separate mobile content server 130 dedicated to servicing the mobile client 118 and other clients connected via the wireless network 116. The mobile content server 130, among other things, may convert digital video content to a form usable on one or more different mobile platforms and service content directed through the wireless network 116. In addition, the mobile content server may maintain a local library 132 of converted content for transmitting to client devices though the wireless network 116.

Figure 2:
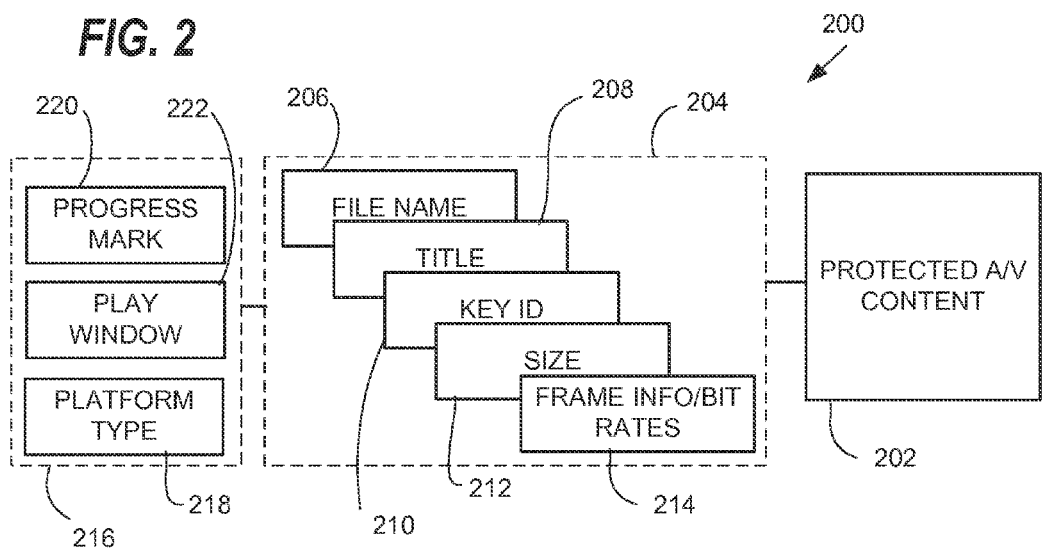
FIG. 2 is a block diagram showing aspects of a data file including protected video content and metadata.

A content file 200 for digital download to a DCM client computer may include a protected component 202 and an associated data component 204, as diagrammed in FIG. 2. The protected component may include content such as video data, audio data, image data, text data, or other content that is protected from access by unauthorized users or devices. For example, the protected content may be encrypted, and not accessible without a secure decryption key. In the alternative, or in addition, the content may be protected using an alternative protection scheme.

The associated or metadata component 204 may contain unprotected data related to or about content in the protected component 202, and that is accessible without restriction. The unprotected data may include, for example, a file name 206, a purported title 208 or description for the protected content, an identifier 210 for one or more keys needed to access the protected content, a file size 212 and/or file date, and encoding information 214 concerning video frames and bit rates used to encode audio or video data included in the protected content. The unprotected data may include other metadata which may vary depending on file source. Characteristically for many data files, both the protected content and the metadata are static after file creation, meaning content and metadata do not change.

Each library file 200 may also be associated with content management data 216 used by the DCM server 108 to manage access to the file for user convenience and conformance to licensed conditions. The content management data 216, metadata 204 and protected NV content may be associated with each other by being grouped in a single data structure, for example in a data file or in a database record, or by corresponding identifiers grouped in a single data structure. Content management data 216 may be included as part of the file 200, may be maintained in one or more files separate from file 200, or both. The content management data may include, for example, a progress mark 220 indicating viewing progress of file 200, play window information 222, such as the window period length and play initiation time/date, and platform type 218 of mobile clients or other clients authorized to access the video content included in the file. To enable functionality of the progress mark across multiple viewing devices, current viewing progress 220 may be transmitted to the DCM server in response to termination of a viewing session for the associated video content, whether on a mobile device or other client. Subsequently, the DCM server may publish the current progress mark to all registered clients, or to a specific client in response to a data request. Therefore, when play of the content continues at any device registered with the DCM server for the user account, it can resume at the point indicated by the progress mark.

Similarly, play window data 222 may also be provided to and from the DCM server in response to specific events involving associated content. For example, play window data may be provided from a mobile device or other client to the server, in response to first initiation of play of a content title on a registered client. The data 222 may include a time/date stamp recording the initiation time, an indication of the length of the time window. Subsequently, the DCM server may publish the time window data to all registered clients for the applicable user account, or to a specific client in response to a data request. Any client on which play of the time-restricted client is requested may thereby determine, using the data 222 and an indicator of the current time, whether or not continued play of the content is permitted. If further play is not permitted, the client may prevent further access to the content. It should be apparent that play window data is not required or used when the content is free from any restrictions to limit play to a specific time window.

Platform type data 218 and other data identifying mobile devices registered for a user account, for example, telephone numbers, may be maintained in a registry by the DCM server for each user account. In addition, in embodiments where the mobile content server 130 maintains copies of content for streaming to mobile devices, the platform information informs the mobile content server of authorized devices and platforms for specific content. The mobile content server 130 can then respond appropriately to content requests, by streaming content in a compatible data format to authorized mobile clients, while refusing requests from unauthorized clients. In both cases, the mobile content server does not need to request user authentication information such as a user ID or password from the requesting mobile client, and may freely stream the content without obtaining any authentication information.

Figure 3:
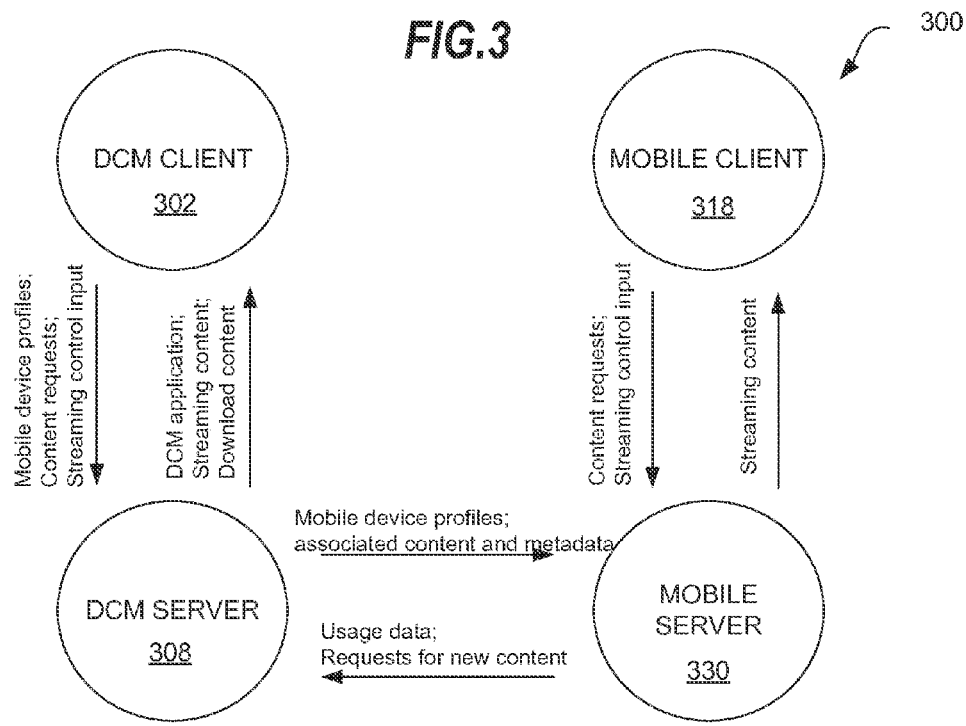
FIG. 3 is a functional block diagram showing an example of data flows within a multi-client video content distribution and management system.

Consistent with the foregoing, examples of data flows within a multi-client video content distribution and management system 300 are shown in FIG. 3. An identification server is omitted from the figure for illustrative simplicity, but may also be present as shown in FIG. 1.

The DCM server 308 has several important functions with respect to the DCM client 302 and the mobile server 330. The server 308 does not interact directly with any mobile client 318. With respect to the DCM client 302, when setting up a new client the server 308 downloads a DCM application for installation on client 302, and registers the resulting application instance as belonging to a user account identified and authenticated in an initial registration process. In addition, the DCM server 308 receives mobile device profile information from the client 302, and registers the profile information as belonging to an identified user. The DCM server 308 also receives requests for streaming video and/or digital download of video content from the DCM client 302. In response to digital download requests, the DCM server determines that the client is authorized to receive a file, and transmits authorized files to the client. In response to streaming video requests, the DCM server verifies that the client is authorized to receive the requested streaming content, and streams the video content to the client.

With respect to the mobile server 330, the DCM server 308 provides mobile device profiles and library content data to the mobile server. For example, the DCM server may provide data and content as discussed above in connection with FIG. 2. The mobile server may translate library video content received from the DCM server to a format suitable for streaming to the indicated mobile platforms, either in response to content requests or in advance of such requests. In addition, the DCM server 308 may receive usage data from the mobile server, for example, progress data and play window data as previously discussed, or other data reporting on video data served by the mobile server 330 to mobile clients. The DCM server may also receive requests for new content relayed from mobile clients, wherein the new content is not available in the mobile server's content storage for the requesting client. In such cases, the DCM server and the mobile server may cooperate to enable access to the video content, for example as part of a licensing transaction with a user.

The mobile server 330 also services content requests from the mobile client 318. In response to authorized requests, the mobile server streams video content to the mobile device and tracks progress and use of streaming video as reported by the client. The mobile server may maintain a database or table for telephones numbers of devices authorized to receive each content title in its data store. In response to receiving a request for content, the mobile server may determine using the device phone number whether or not the requesting device is authorized to receive the requested title. The mobile server may perform this determination without requiring an account identifier or password from the mobile client. Thus, the mobile device user enjoys the convenience of mobile access to the content library for the DCM client 302, while being spared the inconvenience of any authentication session from the mobile device.

The systems 100 and 300 therefore rely on designation of authorized mobile devices via a registered DCM client device operating an authorized DCM application, to establish a profile for authorized mobile devices used with a user account. Establishing these profiles may be accomplished via a user interface window 400 operating and displayed on the DCM client, as shown by way of example in FIG. 4. In the left column 402 of window 400, interactive objects 406 and 408 are provided for entry of profile information. To set up a mobile device to receive content, the user need do nothing more than enter the device's phone number using the data entry object 406, and specify the phone type using data entry object 408, for example by selecting from a list of supported mobile devices, while connected to the DCM in a secure session authorized for the user. In the alternative, or in addition, the user may manually configure a mobile device via its web browser using a URL for the mobile content server and a supplied PIN number, as indicated at 410. A list of successfully registered mobile devices is displayed in the right column 404. This list may include one or more links 412 for requesting that a registered device be unregistered or removed from the list.

Figure 5:
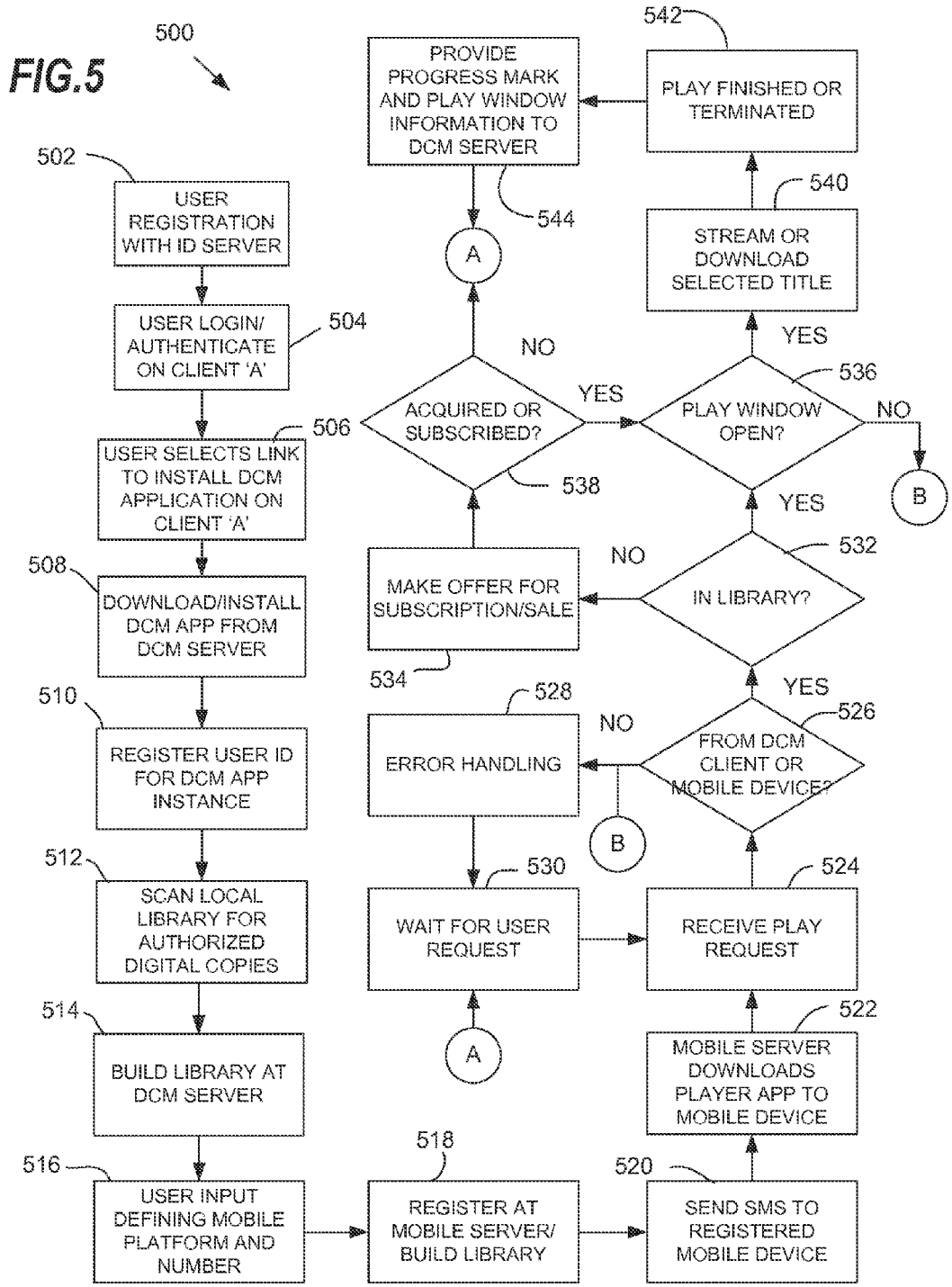
FIG. 5 is flow chart illustrating examples of novel operations and aspects of the present technology.

By way of example, a method 500 as shown in FIG. 5 illustrates operations of the system described above to enable content management across multiple client devices. Initially, an identification server registers a user 502 in response to user input from a connected client. The registration 502 establishes a user account for use by the DCM server. The account may also be used for licensing new content to be added to a content library for the registered user. Once establishing an account, the identification server completes an authentication process 504 with a client device to establish an initial secured session between a DCM server and the client. The secure session includes causing an application to operate on the client device that provides an option for the user to install a DCM client application, for example by selecting a link or dialog button. In response to detecting selection of a link or other signal from the client 506 to install the DCM application, the DCM server transmits 508 the DCM application to the client device for installation 508. The client, in response to user input, installs the DCM application and initiates it.

Once installed, the DCM application confirms that it has been successfully installed on the client by sending a signal to the DCM server. The DCM application may also transmit a hardware "fingerprint" or other identifier for the client on which it is installed to the DCM server. In response to receiving the confirmation signal, the DCM server registers the client identifier with the authenticated user account 510 for the installation session. In subsequent sessions with the client, the DCM server may use the client identifier to link activity in the subsequent sessions with the registered user account.

In addition, the DCM client application may scan local memory of the client 512 to identify authorized digital copies of content that may already be present there, and transmit identification information for the authorized copies to the DCM server. This may be performed in successive parts, such as first identifying digital copies of content in local storage, and then determining whether or not the copy is authorized. The client application may apply a scanning query using known characteristics of digital content files to identify local copies. Known characteristics may include, for example, file names, file types, file metadata, file structure, hashed digital signatures, non-hashed digital signatures, or any other suitable filter for selectively locating local digital content. It should be apparent that the scanning process will identify only such digital content as has known characteristics, generally but not exclusively as a result of being a defined released via a known distribution channel.

After finding a copy of digital content stored locally, the client application may look up a designated media store, for example a Windows Media store, and verify that the consumer has a valid DRM license for the local content. Identifying and verifying authorized content may include comparing digital signatures of local-stored copies with authorized digital signatures for the client contained in a secure local or remote store for the client device. Generally, when a client is used to obtain a licensed or otherwise authorized digital copy, a record of the transaction including a digital signature for the authorized content, or a copy of the content, may be maintained in a secure computer memory, for example at a transaction server. Subsequently, the client may compare a digital signature of a local copy, or the copy itself, to a signature or copy maintained in the secure store. If the local copy is authorized, the client will locate a corresponding signature or copy in the secure store that matches the local copy.

In response to receiving the identification information, the DCM server may build a list or library file 514 containing the identifiers for all the client's existing content, and associated metadata as described herein. Optionally, the client may upload digital copies of the library items to the DCM server, or the DCM server may retrieve copies from another source. The DCM server may maintain the uploaded or retrieved content in a locked account for use by authorized users according to applicable license terms. The DCM server may determine applicable license terms by scanning file metadata and/or communicating with a designated administrative server for specific digital content. The identity of the authorized user or users may be determined with reference to the source client or clients and the registration process used, for example the registration at 502.

Figure 4:
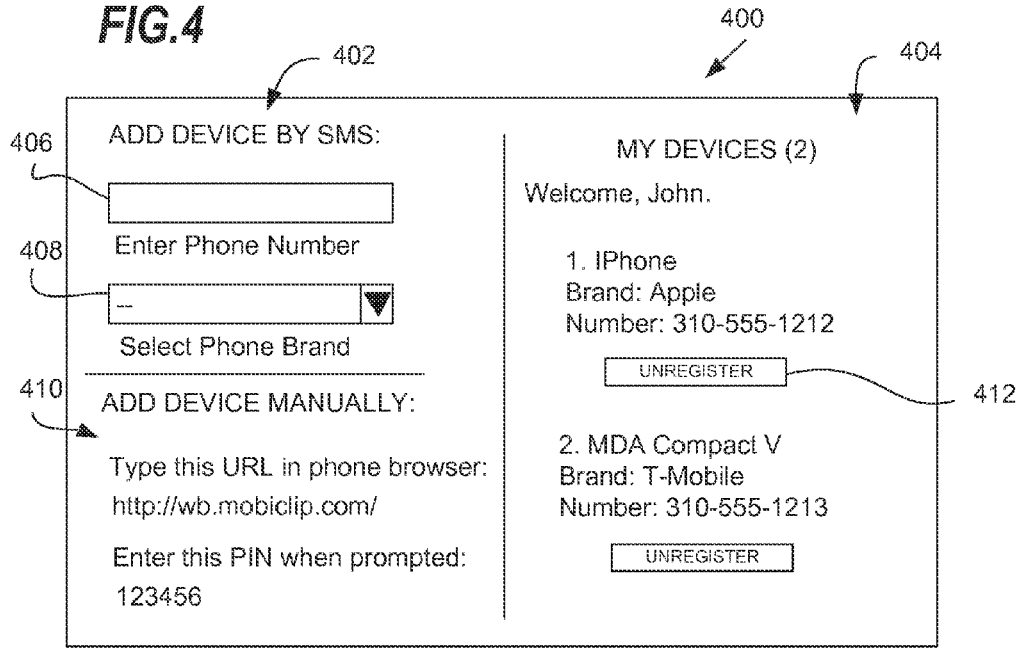
FIG. 4 is simplified screen shot showing an example of a user interface screen for managing registration of mobile devices for a user account, using a client computer registered with the user account.

To further define the access network for the user account, the client via the DCM application may receive user input 516 defining a mobile device platform and telephone number that the user would like to use as an ancillary device to access content in the library. For example, user input may be received by the client via a user interface as shown in FIG. 4. The client may transmit the mobile device platform and telephone number for one or more mobile devices entered by the user to the DCM server.

The DCM server or client may register each mobile device 518 at the mobile server, using the mobile device platform and telephone number. The mobile device platform may maintain records for registered mobile devices in a local registry, in response to information from the DCM server. The mobile content server, among other things, converts digital video content to a form usable on one or more different mobile platforms, and may maintain a local library of converted content for transmitting to mobile device. In response to receiving a request to register a new mobile device, the mobile content server may transmit an SMS message to the mobile device that includes a link for downloading an access application for accessing mobile video content supplied from the mobile content server. In the alternative, the SMS message may be transmitted from a different server, or a link for downloading the access application may be provided in some other way, such as via a web page interface.

At 522, the mobile server downloads the mobile access application to the newly registered mobile device. The mobile device may then install the application locally. After installation, the mobile device may be used to request access to any video content in the user's library, wherein the "user" is the one that caused the DCM application to be installed on the initial client 'A' (see box 508). The mobile access application, when executed by the mobile device, may present a user interface permitting indication or selection of library content. In response to indication or selection of library content, the mobile access application may generate a "play" request to the mobile server, requesting access to specific library content. A play request may also be generated from a non-mobile client on which an instance of the DCM application is installed, for example, the initial client 'A.'

In response to receiving a play request 524, a mobile server or DCM server may determine 526 whether or not the request originated from a DCM client or authorized mobile device. For example, a mobile access server may check the registration of the telephone number assigned to the device that transmitted the request. For further example, a DCM server may check the registration of the requesting client using a cookie, hardware fingerprint, or other identifier. In response to determining that the incoming play request did not originate from a registered device, the receiving server may invoke an error handling routine 528, such as, for example, denying the request and transmitting an indication of the reason for denial to the requesting device. The server may then wait for the next request 530.

In response to determining that the request originated from a registered device, the server may determine 532 whether or not the requested content is included in the library for the originating device; that is, whether or not in the library for the user account under which the device is registered. For example, the receiving server may check an identifier for the requested video content as specified in the request against a local or remote library list for the relevant user account. In response to determining 532 that the requested content is not included in the user's library, the server may transmit a message 534 to the requesting client, inviting the client to acquire or subscribe to the requested content. In response to determining 538 that the user has subscribed to or acquired the requested content, the server may determine 536 whether or not a play window is applicable and open for the requested content. Conversely, in response to determining 538 that the user has not subscribed to or acquired the requested content, the server may wait for the next user request 530.

In response to determining 532 that the requested content is included in the user's library, the server may determine 536 whether or not a play window is applicable and open for the requested content. For example, temporary content may be available for only a limited time window, which is specified in secure data associated with or part of the requested content. In this case, the server may retrieve and read the relevant data portion. In the alternative, or in addition, the applicability and status of a time window may be indicated in a library database or other data structure in association with the content identifier. In the second case, the server may query the relevant database or table to determine the relevant time window. Yet another option is to communicate with an authoritative server tasked with monitoring time windows for video content.

In response to determining 536 that a play window applies and is not open for the requested content, the server may invoke an appropriate error handling routine 528 and wait for the next content request 530. In response to determining 536 that a play window does not apply, or if applicable is open for the requested content, the server may stream or download 540 the requested content to the requesting device, depending on the requested mode of delivery and applicable restrictions. In an embodiment, requested video content is delivered via streaming only to mobile devices; that is, digital download is not available for mobile devices but is available for an initial or anchor client 'A.' In other embodiments, all technically feasible delivery options are available for mobile devices.

The receiving device then operates the applicable client access software to view the downloaded or streamed video content. After the client access software has completed or terminated an access session 542 for a content title, the software may transmit 544 an indication of access status to the DCM server, mobile server, or both. For example, the client application may provide a progress indicator, play window initiation information, or other usage data to one or more of these servers. The servers may process status data for its intended use and wait 530 for the next user data request.

Figure 6:
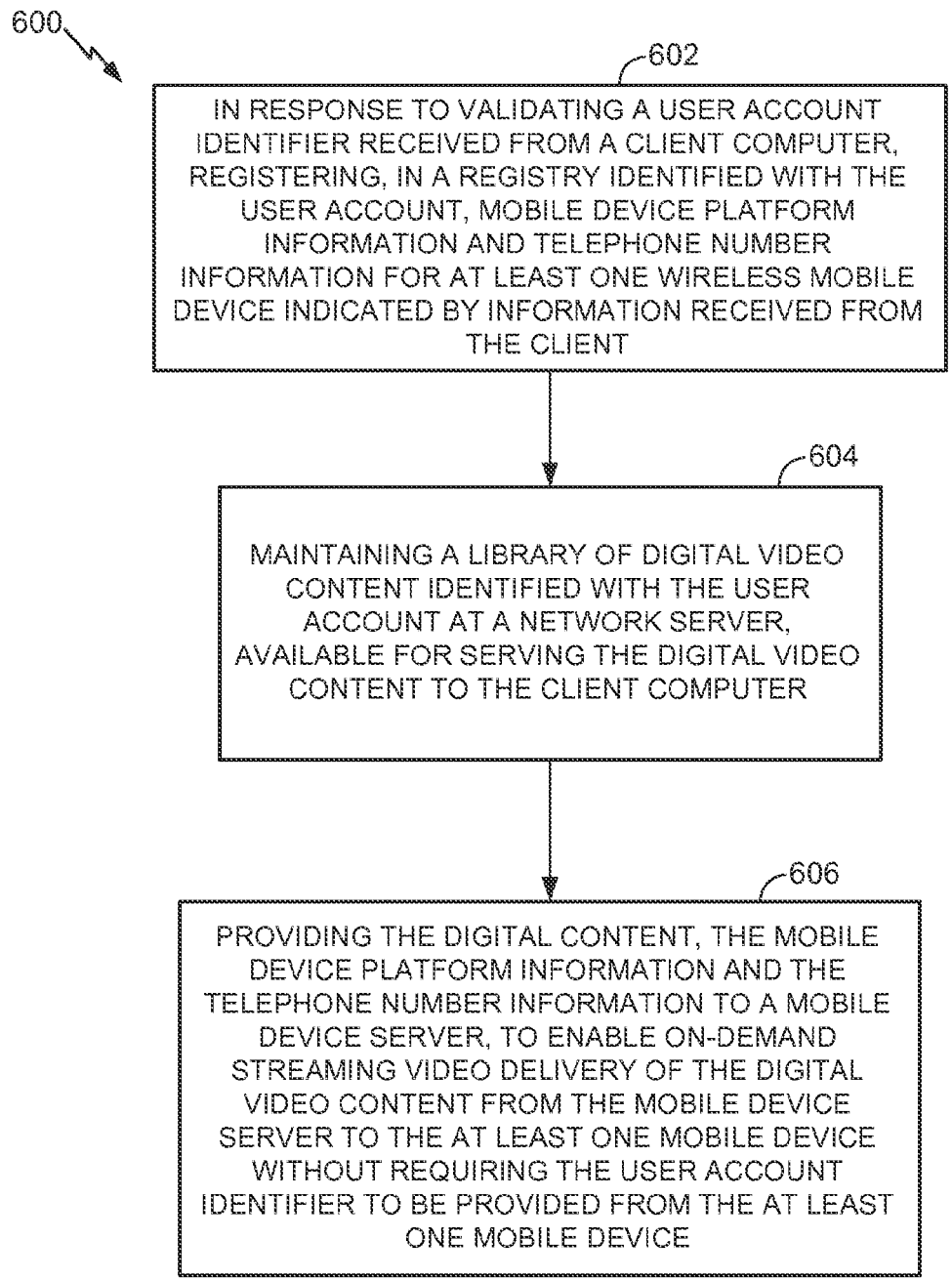
FIG. 6 is a flow chart showing an example of a method for registering and distributing video content to one or more mobile devices.

More detailed operations 600 of a system component such as a DCM server are illustrated in FIG. 6. In an initial operation, a DCM server may register 602 mobile device platform information and telephone number information for at least one wireless mobile device indicated by information received from a client in a registry identified with a user account. Registering 602 may be performed in response to validating a user account identifier received from the client computer.

In addition, the DCM server may maintain 604 a library of digital video content identified with the user account at a network server, available for serving the digital video content to the client computer. The DCM server may also perform operations for providing the digital content, the mobile device platform information and the telephone number information to a mobile content server 606, to enable on-demand streaming video delivery of the digital video content from the mobile content server to the at least one mobile device without requiring the user account identifier to be provided from the at least one mobile device. The mobile content server thereby freely provides the library content in response to requests from a mobile device identified by the telephone number supplied by the DCM server.

Figure 7:
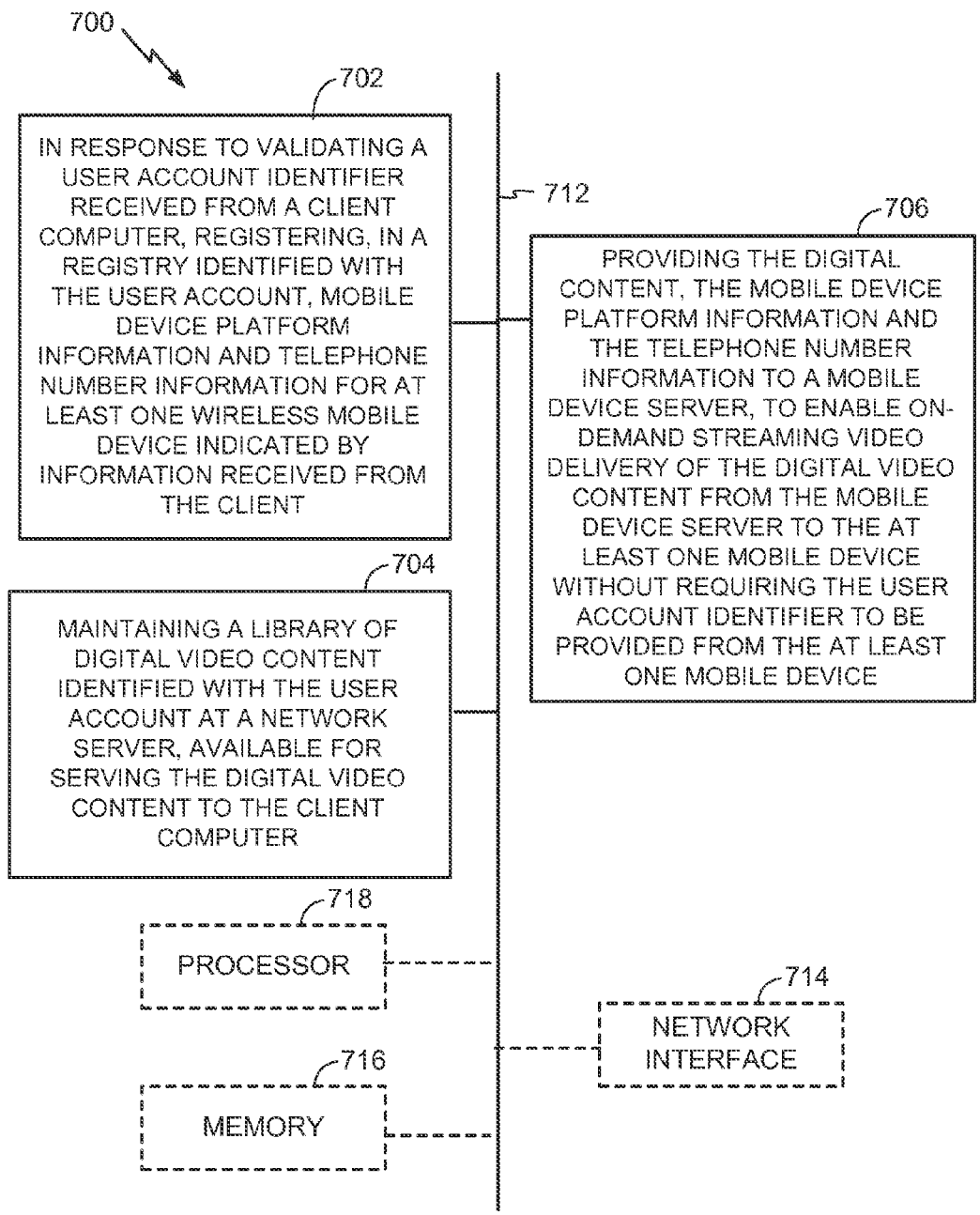
FIG. 7 is a block diagram showing illustrative components of an apparatus for registering and distributing video content to one or more mobile devices.

It should be noted that the telephone number referenced here should be distinct and separate from the user account identifier. The telephone number does not function as a user account identifier for the library content, designating principally an assigned address for the device in a mobile communications system. In contrast, the user account identifier for the library content does not function as the identifier for any device in a wireless communication system, designating instead an account for clearing transactions for the digital video content contained in the library. Therefore, the account holder for the video library may designate any number of mobile devices to receive library content, for example, 1, 2 or 3, subject only to limits placed by a system administrator Consistent with method 600, and as further illustrated by FIG. 7, an apparatus 700 may function as a DCM server. The apparatus 700 may comprise an electronic component or module 702 for, in response to validating a user account identifier received from a client computer, registering, in a registry identified with a user account, mobile device platform information and telephone number information for at least one wireless mobile device indicated by information received from the client. The apparatus 700 may comprise an electronic component or module 704 for maintaining a library of digital video content identified with the user account at a network server, available for serving the digital video content to the client computer. In addition, The apparatus 700 may comprise an electronic component or module 706 for providing the digital content, the mobile device platform information and the telephone number information to a mobile content server, to enable on-demand streaming video delivery of the digital video content from the mobile content server to the at least one mobile device without requiring the user account identifier to be provided from the at least one mobile device.

The apparatus 700 may optionally include a processor module 718 having at least one processor; in the case of the apparatus 700 this may be configured as a computer server, rather than as a general purpose microprocessor. The processor 718, in such case, may be in operative communication with the modules 702-706 via a bus 712 or similar communication coupling. The processor 818 may effect initiation and scheduling of the processes or functions performed by electrical components 702-706.

In related aspects, the apparatus 700 may include a network interface module 714 through with the processor 718 may send and receive information to clients and other servers. In further related aspects, the apparatus 700 may optionally include a module for storing information, such as, for example, a memory device/module 716. The computer readable medium or the memory module 716 may be operatively coupled to the other components of the apparatus 700 via the bus 712 or the like. The memory module 716 may be adapted to store computer readable instructions and data for effecting the processes and behavior of the modules 702-706, and subcomponents thereof, or the processor 718, or the methods disclosed herein, and other operations for content identification, playing, copying, and other use. The memory module 716 may retain instructions for executing functions associated with the modules 702-708. While shown as being external to the memory 716, it is to be understood that the modules 702-706 may exist at least partly within the memory 716.

Figure 8:
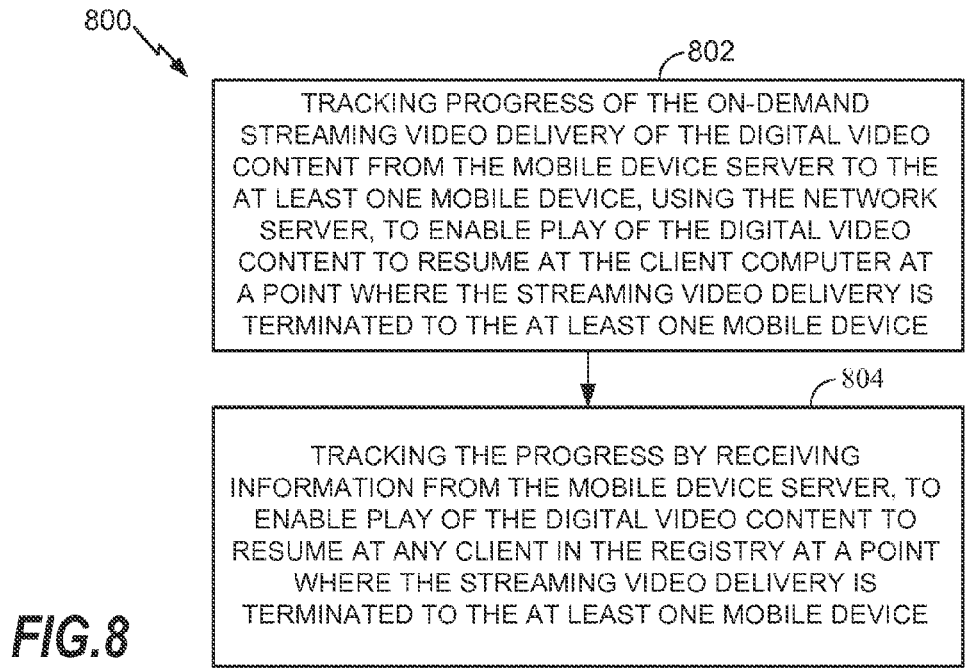

FIG. 8 shows additional operations 800 that may be performed by a server, in conjunction with method 600. The apparatus 700 may similarly be configured with additional modules for performing any or all of operations 800, together with the modules 702-706. The method 600 may include any one or both of the additional operations 800, in any operative order. The method 600 may further comprise comprising tracking progress 802 of the on-demand streaming video delivery of the digital video content from the mobile content server to the at least one mobile device, using the network server, to enable play of the digital video content to resume at the client computer at a point where the streaming video delivery is terminated to the at least one mobile device. The method 600 may further comprise tracking the progress using the mobile content server 804, to enable play of the digital video content to resume at any client in the registry at a point where the streaming video delivery is terminated to the at least one mobile device.

Figure 9:
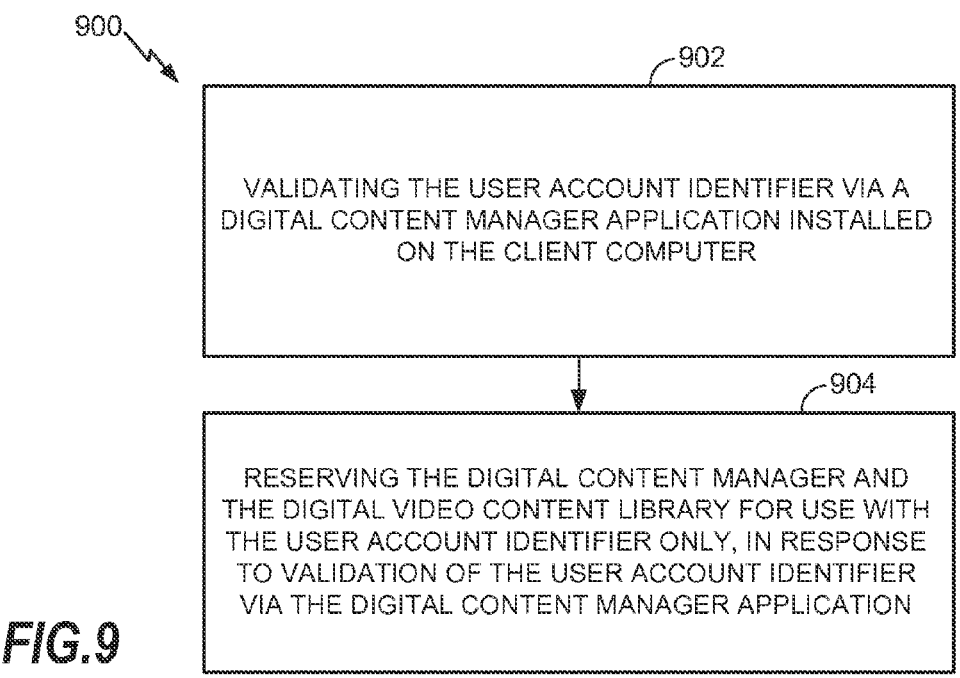

FIG. 9 shows additional operations 900 that may be performed by a server, in conjunction with method 600. The apparatus 700 may similarly be configured with additional modules for performing any or all of operations 900, together with the modules 702-706. The method 600 may include any one or both of the additional operations 900, in any operative order. The method 600 may further comprise validating the user account identifier 902 via a digital content manager application installed on the client computer. The method 600 may further comprise reserving 904 the digital content manager and the digital video content library for use with the user account identifier only, in response to validating the user account identifier via the digital content manager application. Once reserved for the user account, the DCM client application cannot be used to service any other account.

Figure 10:
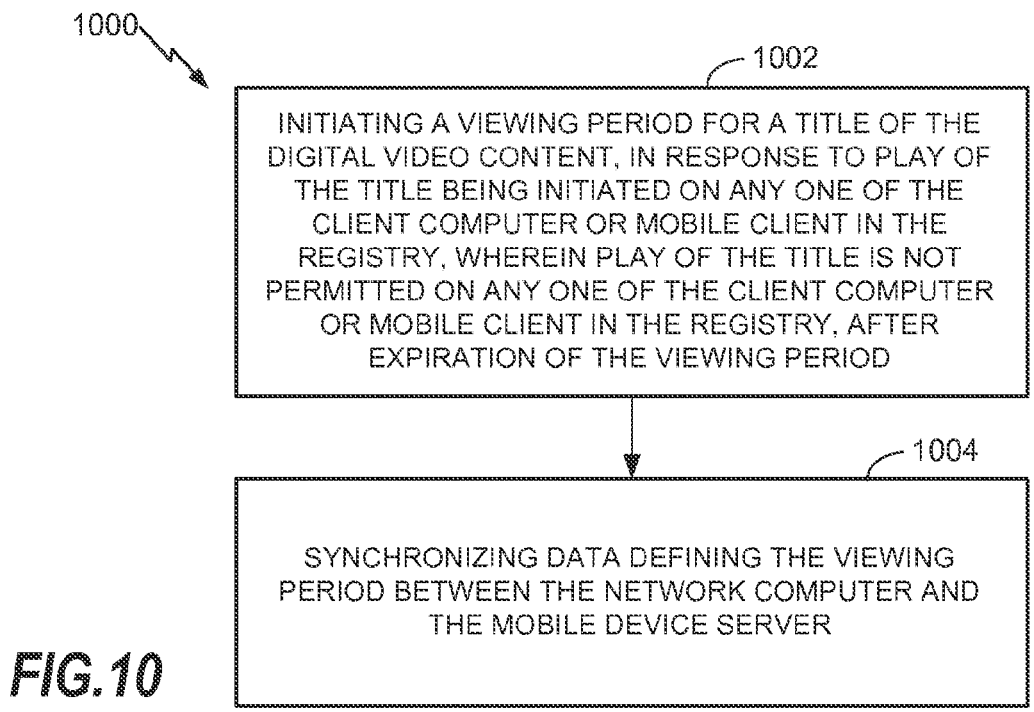

FIG. 10 shows additional operations 1000 that may be performed by a server, in conjunction with method 600. The apparatus 700 may similarly be configured with additional modules for performing any or all of operations 1000, together with the modules 702-706. The method 600 may include any one or both of the additional operations 1000, in any operative order. The method 600 may further comprise initiating a viewing period 1002 for a title of the digital video content, in response to play of the title being initiated on any one of the client computer or mobile client in the registry, wherein play of the title is not permitted on any one of the client computer or mobile client in the registry, after expiration of the viewing period. The method 600 may further comprise synchronizing data defining the viewing period between the network computer and the mobile content server 1004.

Figure 11:
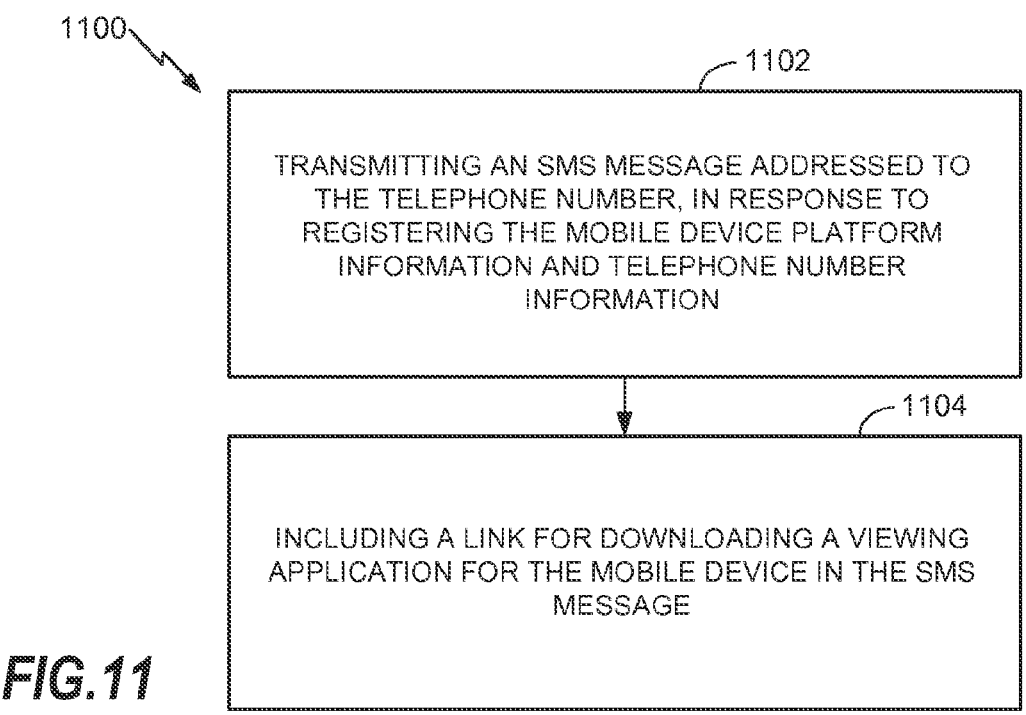

FIG. 11 shows additional operations 1100 that may be performed by a server, in conjunction with method 600. The apparatus 700 may similarly be configured with additional modules for performing any or all of operations 1100, together with the modules 702-706. The method 600 may include any one or both of the additional operations 1100, in any operative order. The method 600 may further comprise transmitting an SMS message addressed to the telephone number 1102, in response to registering the mobile device platform information and telephone number information. The method 600 may further comprise including a link for downloading a viewing application for the mobile device in the SMS message 1102.

FIG. 12 shows additional operations 1200 that may be performed by a server, in conjunction with method 600. The apparatus 700 may similarly be configured with additional modules for performing any or all of operations 1200, together with the modules 702-706. The method 600 may include any one or all of the additional operations 1200, in any operative order. The method 600 may further include, at 1202, scanning a file system in a computer-readable storage resource identified as owned by the user to identify prospective library content for including in the library of digital video content. For example, the server may scan a local storage device of a client the user is using to connect with the server, or a cloud storage device identified by the user. The client application may apply a scanning query using known characteristics of digital content files to identify local or other copies, as more particularly described herein above.

The method 600 may further include, at 1204, determining whether the prospective library content is authorized for use by the user. For example, the method 600 may further include, at 1206, determining whether the prospective library content is authorized by comparing a digital signature of the prospective library content with an authorized digital signature for content licensed to the user by a content provider, for example an authorized signature obtained from a secure site. The server is not limited to using signature comparison to make this determination. The server may use any suitable method for determining whether the prospective library content is authorized for use by the user, including but not limited to the particular examples disclosed herein above. The method 600 may further include, at 1208, adding the prospective library content to the library of digital video content based on determining that the prospective library content is authorized for use by the user.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer-readable media may include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or non-transitory medium.

The invention claimed is:

1. A method, comprising:
   authenticating, by at least one server over a computer network, a user account identifier for a user account from a client device;
   registering, by the at least one server, a telephone number for at least one wireless mobile device in a registry identified with the user account based on the authenticating, as a pre-authorized identifier for accessing digital content licensed for use with the client device;
   maintaining, by the at least one server, a library of digital content identified with the user account for access by the at least one wireless mobile device, available for streaming over the computer network;
   initiating streaming of the digital video content by the at least one server to the at least one wireless mobile device via the computer network without requiring user authentication from the at least one wireless mobile device, based on the registering of the telephone number as the pre-authorized identifier; and
   tracking progress of the streaming of the digital content from the at least one server to the at least one wireless mobile device, by the at least one server, to enable play of the digital content to resume at the client device at a point where the streaming is terminated to the at least one wireless mobile device.

2. The method of claim 1, further comprising tracking the progress by the at least one server, to enable play of the digital video content to resume at any client in the registry at a point where the streaming video delivery is terminated to the at least one wireless mobile device.

3. The method of claim 1, further comprising synchronizing, by the at least one server, a copy of the digital content library maintained on the client device.

4. The method of claim 1, wherein authenticating the user account identifier further comprises communicating with a digital content manager application installed on the client device.

5. The method of claim 4, further comprising reserving the digital content manager application and the digital content library for use with the user account identifier only, in response to authenticating the user account identifier via the digital content manager application.

6. The method of claim 1, further comprising transmitting, by the at least one server, an SMS message addressed to the telephone number, in response to registering the wireless mobile telephone number.

7. The method of claim 6, further comprising including, by the at least one server, a link for downloading a viewing application for the mobile device in the SMS message.

8. An apparatus comprising at least one processor coupled to a memory, the memory holding instructions that when executed by the at least processor cause the apparatus to perform:
   authenticating a user account identifier for a user account from a client device over a computer network;
   registering a telephone number for at least one wireless mobile device in a registry identified with the user account based on the authenticating, as a pre-authorized identifier for accessing digital content licensed for use with the client device;
   maintaining a library of digital content identified with the user account for access by the at least one wireless mobile device, available for streaming over the computer network;
   initiating streaming of the digital video content to the at least one wireless mobile device via the computer network without requiring user authentication from the at least one wireless mobile device, based on the registering of the telephone number as the pre-authorized identifier; and tracking progress of the streaming of the digital content to the at least one wireless mobile device, to enable play of the digital content to resume at the client device at a point where the streaming is terminated to the at least one wireless mobile device.

9. The apparatus of claim 8, wherein the memory holds further instructions for tracking the progress, to enable play of the digital video content to resume at any client in the registry at a point where the streaming video delivery is terminated to the at least one wireless mobile device.

10. The apparatus of claim 8, wherein the memory holds further instructions for authenticating the user account identifier at least in part by communicating with a digital content manager application installed on the client device.

11. The apparatus of claim 8, wherein the memory holds further instructions for transmitting an SMS message addressed to the telephone number, in response to registering the telephone number, and for including a link for downloading a viewing application for the mobile device in the SMS message.

12. A method, comprising:
authenticating, by at least one server over a computer network, a user account identifier for a user account from a client device;
registering, by the at least one server, a telephone number for at least one wireless mobile device in a registry identified with the user account based on the authenticating, as a pre-authorized identifier for accessing digital content licensed for use with the client device;
maintaining, by the at least one server, a library of digital content identified with the user account for access by the at least one wireless mobile device, available for streaming over the computer network;
initiating streaming of the digital video content by the at least one server to the at least one wireless mobile device via the computer network without requiring user authentication from the at least one wireless mobile device, based on the registering of the telephone number as the pre-authorized identifier; and
initiating, by the at least one server, a viewing period for a title of the digital content, in response to play of the title being initiated on any one of the client device or the wireless mobile client, wherein play of the title is not permitted on any one of the client device or the wireless mobile client, after expiration of the viewing period.

13. A method, comprising:
authenticating, by at least one server over a computer network, a user account identifier for a user account from a client device;
registering, by the at least one server, a telephone number for at least one wireless mobile device in a registry identified with the user account based on the authenticating, as a pre-authorized identifier for accessing digital content licensed for use with the client device;
maintaining, by the at least one server, a library of digital content identified with the user account for access by the at least one wireless mobile device, available for streaming over the computer network;
initiating streaming of the digital video content by the at least one server to the at least one wireless mobile device via the computer network without requiring user authentication from the at least one wireless mobile device, based on the registering of the telephone number as the pre-authorized identifier; and
scanning a file system in a computer-readable storage resource identified as owned by the user to identify prospective library content for including in the library of digital video content and determining, by the at least one server, whether the prospective library content is authorized by comparing a digital signature of the prospective library content with an authorized digital signature for content licensed to the user account by a content provider.

14. The method of claim 13, further comprising synchronizing data defining the viewing period between different ones of the at least one server.

15. An apparatus comprising at least one processor coupled to a memory, the memory holding instructions that when executed by the at least processor cause the apparatus to perform:
authenticating a user account identifier for a user account from a client device over a computer network;
registering a telephone number for at least one wireless mobile device in a registry identified with the user account based on the authenticating, as a pre-authorized identifier for accessing digital content licensed for use with the client device;
maintaining a library of digital content identified with the user account for access by the at least one wireless mobile device, available for streaming over the computer network;
initiating streaming of the digital video content to the at least one wireless mobile device via the computer network without requiring user authentication from the at least one wireless mobile device, based on the registering of the telephone number as the pre-authorized identifier; and
initiating a viewing period for a title of the digital content, in response to play of the title being initiated on any one of the client device or mobile client, wherein play of the title is not permitted on any one of the client device or mobile client, after expiration of the viewing period.

16. An apparatus comprising at least one processor coupled to a memory, the memory holding instructions that when executed by the at least processor cause the apparatus to perform:
authenticating a user account identifier for a user account from a client device over a computer network;
registering a telephone number for at least one wireless mobile device in a registry identified with the user account based on the authenticating, as a pre-authorized identifier for accessing digital content licensed for use with the client device;
maintaining a library of digital content identified with the user account for access by the at least one wireless mobile device, available for streaming over the computer network;
initiating streaming of the digital video content to the at least one wireless mobile device via the computer network without requiring user authentication from the at least one wireless mobile device, based on the registering of the telephone number as the pre-authorized identifier; and
scanning a file system in a computer-readable storage resource identified as owned by the user to identify prospective library content for including in the library of digital video content and determining, by the at least one server, whether the prospective library content is authorized by comparing a digital signature of the prospective library content with an authorized digital signature for content licensed to the user account by a content provider.

* * * * *